US005499657A

United States Patent [19]
Schmitt

[11] Patent Number: 5,499,657
[45] Date of Patent: Mar. 19, 1996

[54] VALVE ARRANGEMENT

[75] Inventor: Manfred Schmitt, Friedelsheim, Germany

[73] Assignee: Fisher-Gulde Regelarmaturen GmbH & Co. KG, Ludwigshafen, Germany

[21] Appl. No.: 410,792

[22] Filed: Mar. 27, 1995

[30] Foreign Application Priority Data

Mar. 26, 1994 [DE] Germany .......................... 44 10 567.3

[51] Int. Cl.⁶ .................................................... F16K 11/22
[52] U.S. Cl. ............................................. 137/887; 137/883
[58] Field of Search .................................... 137/883, 887

[56] References Cited

U.S. PATENT DOCUMENTS 4,749,004  6/1988  Peash ................................. 137/887 X
5,269,348  12/1993  Schnaus et al. .

FOREIGN PATENT DOCUMENTS 218808   5/1961  Austria .
169268   3/1905  Germany .
4027622  2/1992  Germany .

*Primary Examiner*—John C. Fox
*Attorney, Agent, or Firm*—Evenson, McKeown, Edwards & Lenahan

[57] ABSTRACT

A valve arrangement including a distributor housing (2) with a distributor duct (4), an inlet duct (46) which leads into the distributor duct (4), at least two outlet ducts (11, 12, 13) which lead out of the distributor duct (4), and a value associated with eac;h outlet duct. The values are integrated into the distributor housing (2) and have regulating flaps (31, 32, 33) whose axes of rotation (37, 38, 39) are arranged such that the flaps are situated partially in the distributor duct (4) and partially in the associated outlet duct (11, 12, 13). This construction reduces the overall size of the valve arrangement and eliminates dead spaces in which medium flowing through the valve arrangement could become trapped.

19 Claims, 5 Drawing Sheets

VALVE ARRANGEMENT

BACKGROUND OF THE INVENTION

This invention relates to a valve arrangement comprising a distributor housing containing a distributor duct, an inlet duct leading into the distributor duct and at least two outlet ducts leading out of the distributor duct, and also containing valves associated with each respective outlet duct and which define the flow cross-section for a medium flowing through the inlet duct and distributor duct into the respective outlet ducts.

Schnaus et al., U.S. Pat. No. 5,269,348 discloses a valve arrangement of this type which comprises an inlet duct and at least two outlet ducts. A valve is associated with each outlet duct in order to distribute the medium fed through the inlet duct as needed to the outlet duct or ducts. In particular, this valve arrangement is used for a viscous medium, such as a polymer melt, in order to facilitate distribution to extruders, spinning devices or the like connected to the outlet ducts. This known valve arrangement comprises a central distributor housing with the above-mentioned ducts and the valves mounted on the housing. Each valve comprises a valve body which can be axially moved like a piston and which is arranged essentially radially with respect to the central distributor housing, whereby the mushroom-shaped valve body can also be moved back and forth in the above-mentioned radial direction. The drive for moving the valve body must be constructed to be relatively large since the pressure of the medium acts upon the valve body to its full extent. Thus, this valve arrangement has comparatively large dimensions. Special measures are required in order to avoid dead spaces in which portions of the medium may be trapped. In principle, the valve body therefore has a mushroom-shaped construction, and the medium flows around the valve body both when the valve is closed as well as when it is opened. Such a construction involves considerable additional expense.

German Patent No. DE 4,027,622 discloses a regulating flap valve which comprises a housing and a duct for the flowing medium. A flap disk is rotatably disposed on a shaft in the housing, the flap disk being integrated into the shaft and being situated with its contour inside the shaft. The flap disk is arranged in a central area of the duct, which area has a rectangular, especially a square, cross-sectional surface.

Austrian Patent Document No. AT 218,808 discloses a valve arrangement for pressure control lines of flow media, in which case several regulating flaps are provided, each of which is associated with a respective outlet duct. In the center of a distributor housing, a common cam plate is provided for actuating the individual regulating flaps. Each regulating flap is pivotably arranged laterally of the mouth of the respective outlet duct leading into the distributor duct and contains a projection which can be engaged by the cam plate in order to open the regulating flap. This valve arrangement contains dead spaces, primarily in the area of the bearings of the individual regulating flaps, in which a viscous medium, such as a polymer melt, may become trapped. Separate and mutually independent actuation of the individual regulating flaps by means of the central cam plate is not possible.

Finally, German Patent No. DE 169,268 discloses a three-way valve which has two outlet ducts, to each of which a respective regulating flap is assigned. The outlet ducts have a circular cross-section and the regulating flaps can be swivelled about a common axis of rotation. There is no distributor duct, and the regulating flaps open by swiveling into the end region of the inlet duct.

Despite the efforts of the prior art, there has remained a need for an improved valve arrangement of the afore-described type.

SUMMARY OF THE INVENTION

It is therefore an object of the invention to provide an improved distributor valve with an inlet channel and a plurality of independently controllable outlet channels.

Another object of the invention is to provide a distributor valve which has a smaller overall size.

A further object of the invention is to provide a distributor valve which avoids dead spaces in which flowing medium may be come trapped.

It is also an object of the invention to provide a distributor valve which has an operationally reliable, compact construction.

Yet another object of the invention is to provide a distributor valve which has a low leak rate.

A still further object of the invention is to provide a distributor valve which is relatively simple to manufacture and assemble and which can be serviced without difficulty.

These and other objects of the invention have now been achieved by providing a valve arrangement comprising a distributor housing containing a distributor duct, an inlet duct leading into the distributor duct, and at least two outlet ducts leading out of the distributor duct; the housing further containing a valve integrated into the distributor housing and associated with each of the respective outlet ducts; each valve variably defining a flow cross-section for a medium flowing through the inlet duct and the distributor duct and out the respective outlet duct; each outlet duct having a rectangular cross-section where it opens into the distributor duct; each valve comprising a regulating flap arranged proximate where the respective outlet duct opens into the distributor duct, and each flap having an axis of rotation arranged such that the flap is situated partially in the distributor duct and partially in the respective outlet duct.

The valve arrangement of the invention is distinguished by a compact and operationally reliable construction. The common distributor housing not only contains the above-mentioned ducts but it simultaneously contains the valves of the at least two outlet ducts. The valves are integrated into the distributor housing which contains the bores for the valve flaps. The flaps as well as the associated central area of the duct are also situated in the common distributor housing. The outlet ducts have a rectangular, preferably square, cross-section where they open into the common distributor duct. The axes of rotation of the regulating flaps are arranged such that the regulating flaps are situated partially in the distributor duct and partially in the respective outlet ducts. Because of this construction, dead spaces in which the flowing medium may become trapped are avoided. When each of regulating flaps is in closed position, its surface associated with the distributor duct forms a virtually continuous continuation or extension of the outer wall of the distributor duct. Since the pressure of the medium acts upon all sides of the flaps, the valve drives may be dimensioned to be considerably smaller; which reduces the overall volume, the cost of material as well as the manufacturing costs. The distributor housing contains an annular distributor duct from which the at least two outlet ducts extend outwardly like the points of a star.

A deflecting element is preferably arranged in the center of the distributor duct. Between the mouth of the inlet duct and the exterior surface of the deflecting element, an annular channel is provided through which the incoming medium can flow into the distributor duct. The deflecting element is advantageously arranged opposite the inlet duct and preferably also projects part-way into the inlet duct, so that the tip of the deflecting element is positioned in the end region of the inlet duct. The medium, which flows through the inlet duct into the annular channel and from the thence into the annular distributor duct, takes on a flow component in the circumferential direction in the distributor duct. As a result, portions of the medium flowing through the valve arrangement are prevented in a particularly advantageous manner from remaining or becoming caught in the distributor duct. Because of this circumferential flow in the annular distributor duct, trapped or static accumulations of the medium will also be avoided even when only a single regulating flap is open. Preferably, the outlet ducts do not have a strict radially outward orientation relative to the center of the distributor duct, but instead the axes of the outlet ducts are offset angularly with respect to the center of the distributor duct. Because of this offset orientation of the outlet ducts, a circumferential flow component is imparted to the medium introduced through the inlet duct, and the formation of deposits or trapped residues of the flowing medium in the distributor duct is avoided.

The regulating flaps are arranged adjacent where the outlet ducts open into the central distributor duct. In relation to the center of the distributor duct, the axis of each flap, which extends through the center of the flap, is situated essentially on the same radius as the outer wall of the distributor duct. The projection of the regulating flap into a plane which extends through the pivot axis of the flap and through the linear contact surfaces between the flap and the duct walls, results in a rectangle, especially a square, which corresponds to the cross-sectional area of the outlet duct.

The inlet duct is advantageously arranged coaxially with respect to the center of the distributor duct and/or of the distributor housing. Opposite the mouth of the inlet duct, the distributor housing and the distributor duct are closed off by means of a closure member. A deflecting element is connected to the closure member. The deflecting element has a conical exterior contour and projects at least to the mouth of the inlet duct into the distributor duct.

In one preferred embodiment of the valve, the flap is constructed such that, in the central area, particularly of the outlet duct, it can be brought in contact with a contact surface in the closed position. Therefore, in the central area of the duct, the flap disk can no longer be rotated completely but can be pivoted only through a predetermined angular range. This assures a low leakage rate in view of different thermal coefficients of the valve housing, on the one hand, and the flap, on the other hand, without any danger that the flap will stick. The flap has a cross-sectional configuration which is similar to an ellipse, with the length of the major axis being larger than the width of the central duct area. The surfaces of the flap which contact the duct walls preferably have a crowned construction. Furthermore, the aforementioned major axis is larger than the diameter of the flap mounting shaft.

In a preferred embodiment, the shaft is surrounded by a centering bushing which rest with an inner base face or flange against the sides of the flap which project radially beyond the exterior surface of the shaft. At the side of the flap disk a seal is also provided between the centering bushing or its base face and the shaft; this seal also resting partially against the above-mentioned sides of the flap. The contact surface of the centering bushing or its inner base with the side surface of the regulating flap can be machined in a very precise manner and adjusted to the flap disk, which also assures a very low leakage at this location, particularly since the seal contacting the side of the flap prevents undesirable leakage of the medium. This measure also compensates in a particularly advantageous manner for the different thermal expansions of the flap and of the housing and assures low leakage of the valve even in case of comparatively large temperature differences.

Additional, preferred embodiments and refinements of the invention are described in the following specification.

BRIEF DESCRIPTION OF THE DRAWINGS

The invention will be described in further detail hereinafter with reference to illustrative preferred embodiments depicted in the accompanying drawings in which.

DETAILED DESCRIPTION OF PREFERRED EMBODIMENTS

Figure 1:
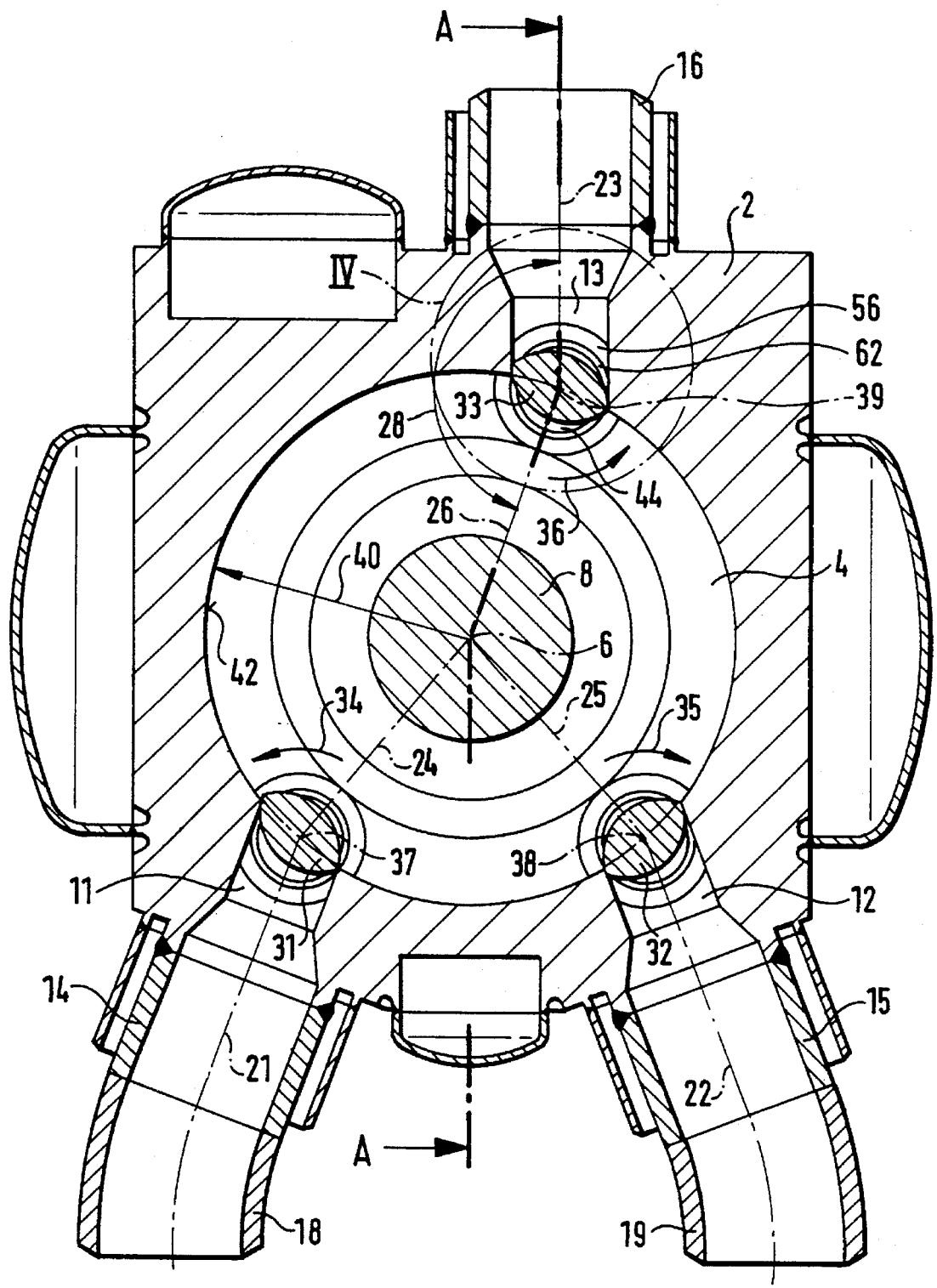
FIG. 1 is a sectional view of a valve arrangement according to the invention with three outlet ducts.

FIG. 1 is a sectional view of a distributor housing 2 in which an annular distributor duct 4 is arranged. The distributor duct 4 is constructed as a cylindrical recess with a deflecting element 8 arranged at the center 6. In front of the plane of the drawing and perpendicular thereto, there is an inlet duct 46 which leads or opens into the distributor duct 4 and whose axis advantageously extends through the center 6. Three outlet ducts 11, 12 and 13 lead out of the distributor duct 4. Outside the housing 2, connection pieces 14, 15, 16 and/or tubes 18, 19, for the medium to be distributed are connected to the three outlet ducts 11, 12, 13. The outlet ducts 11, 12 and 13 are oriented asymmetrically with respect to the distributor duct 4, i.e. the axes 21, 22, 23 of the aforementioned outlet ducts 11, 12 and 13 do not extend through the center 6 of distributor duct 4. Instead, the axes 21, 22 and 23 form an obtuse angle 28 with respect to radial lines 24, 25 and 26, respectively. Because of this asymmetrical arrangement, when the outlet ducts 11, 12, 13 are completely or partially opened or closed, a circumferential component around the center 6 is imparted to the flow of medium. As a result, regardless of the respective positions of the individual valves of the outlet ducts 11, 12 and 13, which will be described hereinafter, trapped accumulations of medium in the distributor duct 4 or parts thereof are prevented in a particularly advantageous manner.

The valves associated with each of the outlet ducts 11, 12 and 13 are also integrated in the distributor housing 2. In FIG. 1, the regulating flaps 31, 32, 33 of these valves are shown in their closed positions. The arrows 34, 35 and 36 indicate the direction of the closing movement of the respective regulating flaps 31, 32 and 33. The axes 37, 38 and 39 of the respective regulating flaps 31, 32 and 33 are oriented perpendicularly with respect to the plane of the drawing and are situated at least approximately at the same radius 40 as the outer wall 42 of the distributor duct 4 which is cylindrical at least in the area of the regulating flaps. This assures that when the regulating flaps 31, 32 and 33 are in their closed positions, and are thereby situated partly in the distributor duct 4 and partly in the respective outlet ducts 11, 12 and 13, there will not be any dead spaces between the respective regulating flaps 31, 32 and 33 and the outer wall 42 of the distributor duct 4. The flaps 31, 32 and 33 are components of respective shafts 44, each of which is surrounded by a centering bushing 56 which will be described in further detail hereinafter. A shaft seal 62 is provided between the centering bushing 56 and the shaft 44. The shaft seal 62 may be made, for example, of polyimide or a comparable material.

Figure 2:
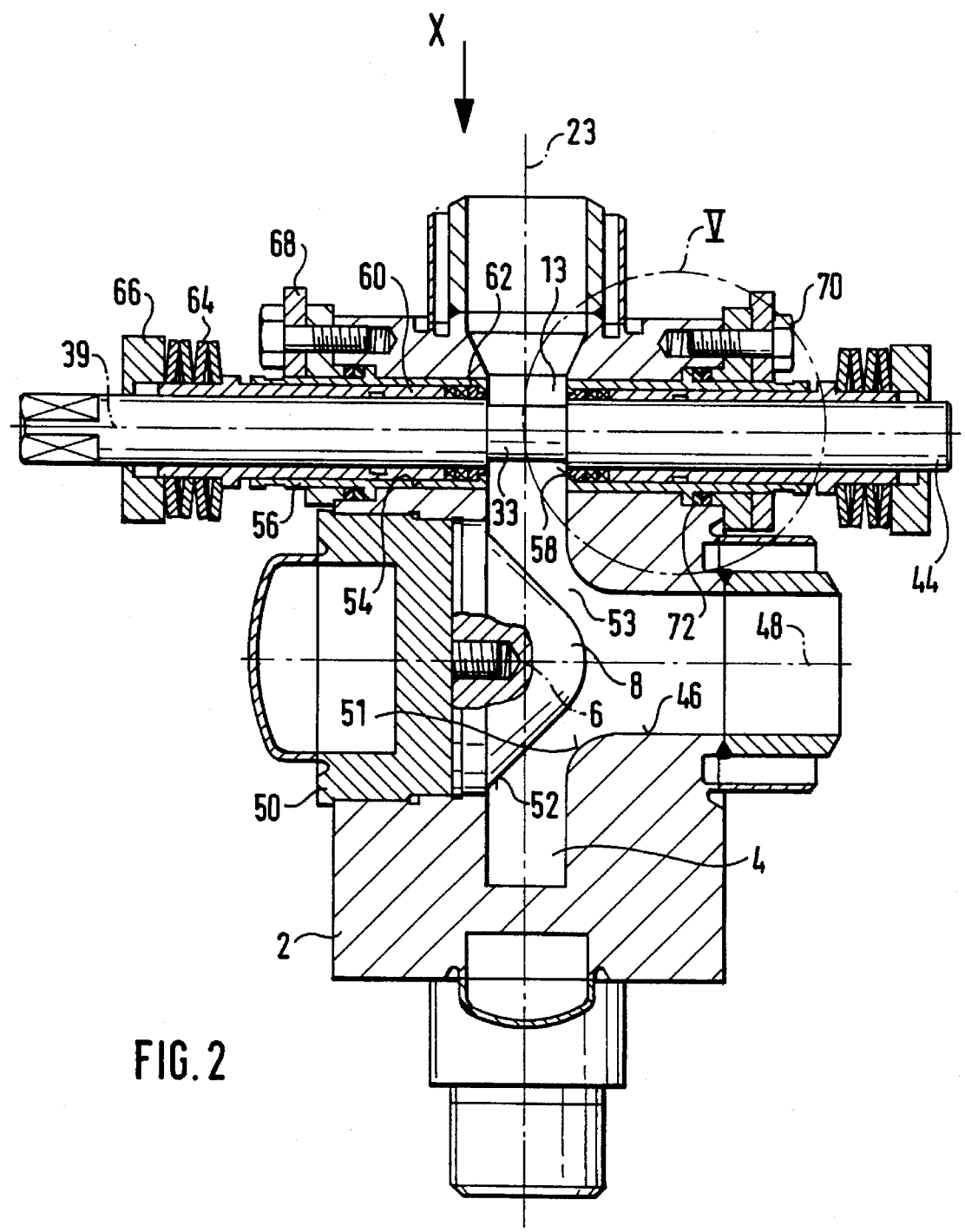
FIG. 2 is a sectional view taken along section line A—A of FIG. 1.

The sectional view of FIG. 2 shows the regulating flap valve integrated in the distributor housing 2 for outlet duct 13 with its regulating flap 33 which is an integral component of a shaft 44. The axis of rotation 39 of the shaft 44 which carries flap 33 extends parallel to the inlet duct 46 whose axis 48 extends through the center 6 of distributor duct 4. Inlet duct 46 opens into the coaxial distributor duct 4 which is closed at its other side by means of a closure member 50 secured to the distributor housing 2. A deflector element 8 is attached to the closure member 50 inside the distributor duct 4. In the embodiment shown, the deflecting element 8 has a conical exterior surface 52 with a rounded tip which extends toward the mouth of inlet duct 46. Thus an annular passageway 53 is formed between the deflecting element 8 and a preferably rounded transition area 51 joining the inlet duct 46 to the annular distributor duct 4. The medium flows through this annular passageway 53 directly into the distributor duct 4. The closure member 50 can easily be removed so that the interior of the distributor housing 2 can be accessed without difficulty for servicing, cleaning, etc.

At least in the area of the regulating flap 33, where outlet duct 13 opens into the distributor duct 4, the outlet duct has a rectangular, preferably square, cross-section. The following description regarding the regulating flap valve with regulating flap 33 apply in a corresponding manner to the two other regulating flap valves for the other two outlet ducts. The distributor housing 2 contains a through bore 54 for the shaft 44 with the regulating flap 33. Through bore 54 extends perpendicularly to the axis 23 of the outlet duct 13 and is advantageously arranged essentially parallel to the axis 48 of the inlet duct 46. On both sides of the outlet duct 13, a centering bushing 56 respectively is inserted into the through bore 54, the inner base face 58 of the centering bushing 56 reaching directly to and immediately adjoining the outlet duct 13. Relative to the interior wall of the centering bushing 56, the inner base 58 is lengthened in the direction of the shaft 44 to form a flange which has an inside diameter only slightly larger than the outside diameter of the shaft 44. By means of an inner bushing 60 which surrounds the shaft 44 and can be axially displaced inside the centering bushing 56 in the direction of the axis of rotation 39, shaft seals 62 are pressed against the aforementioned inner base face 58 of the centering bushing 56. The inner bushing 60 is biased axially by means of springs 64 so that the shaft seal 62 assures an operationally reliable sealing. The springs 64 may be compressed by means of an adjusting plate 66 which is movably secured to the distributor housing 2. An annular body 68 is also connected to the distributor housing 2 by means of screws 70. By means of the annular body 68, a seal 72 arranged in the area of the exterior surface of the centering bushing 56 is compressed and/or fixed against the distributor housing 2.

Figure 3:
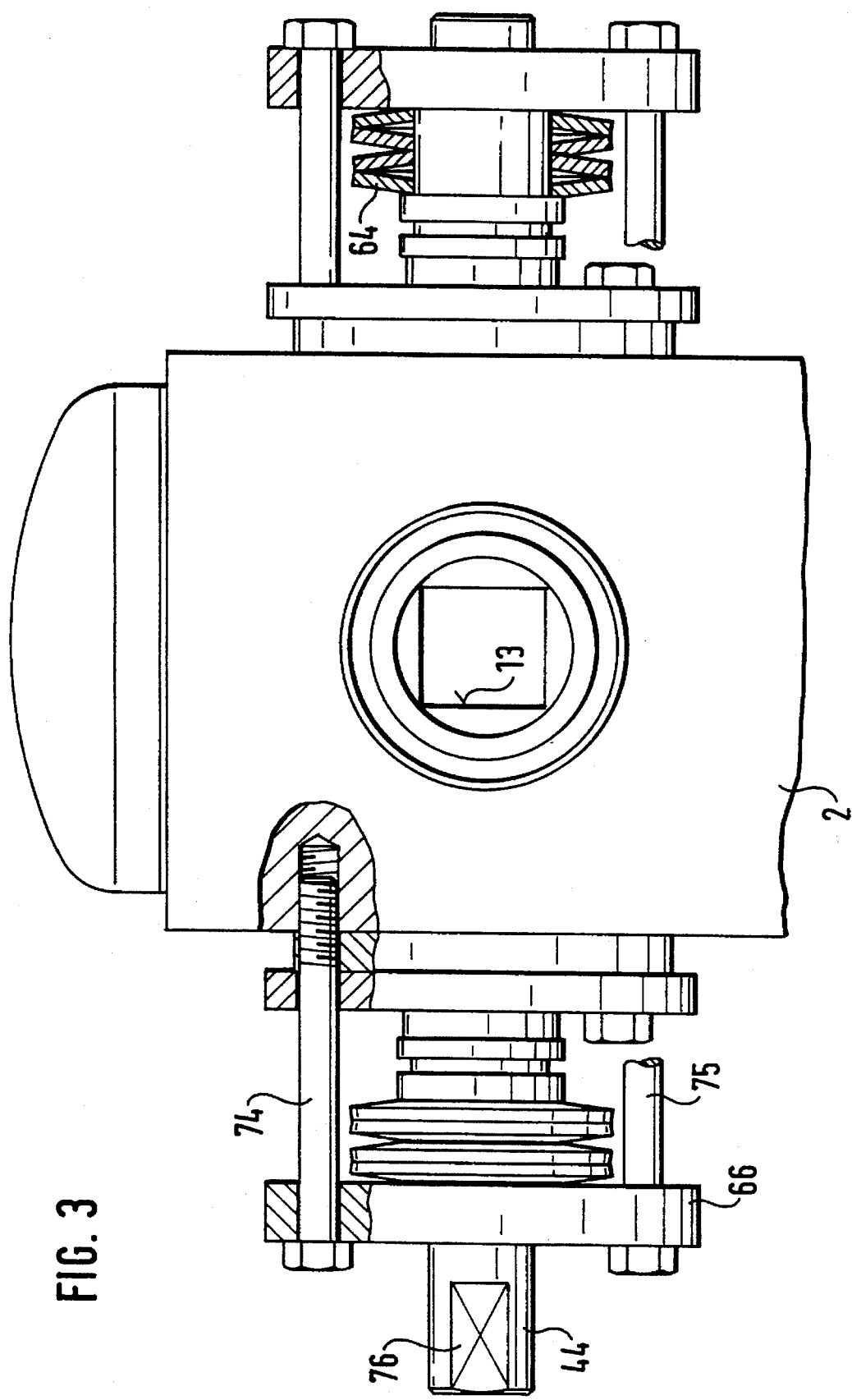
FIG. 3 is a view observed in the direction indicated by the arrow X in FIG. 2.

FIG. 3 is a partial view of the valve arrangement observed in the direction indicated by the arrow X in FIG. 2 in which the square cross-section of the outlet duct 13 in the area of the regulating flap is easily visible. As mentioned above, the adjusting plate 66 is connected to the housing 2 by means of screws 74, 75 so that the springs 64 can be prestressed as required. One end of the shaft 44 is provided with a connection piece 76, which in this case is formed in particular as a square key in order to facilitate connection of an actuating drive.

Figure 4:
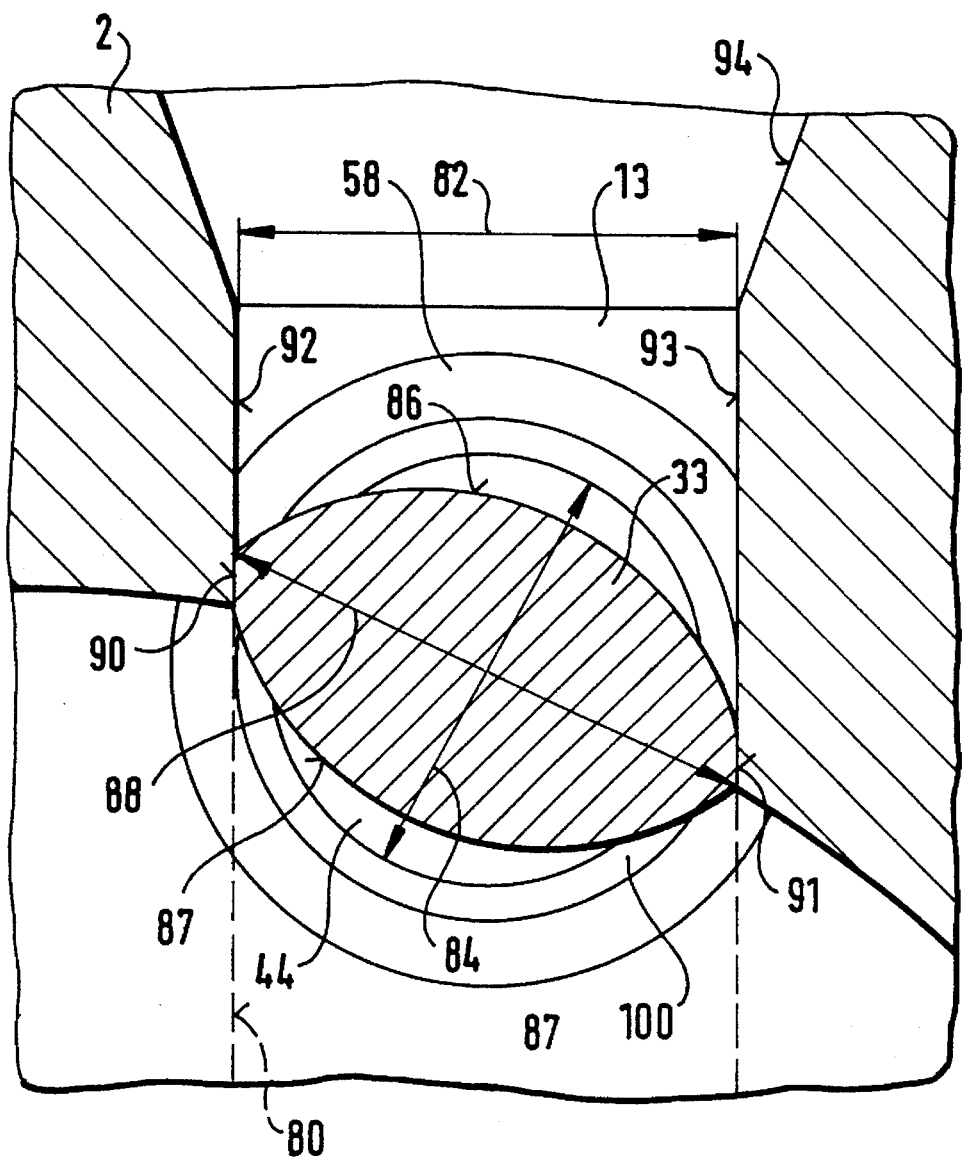
FIG. 4 is an enlarged detail view of the area designated IV in FIG. 1.

FIG. 4 illustrates in detail another specific alternative embodiment of the invention. This embodiment is independent of the above-described multiple-valve arrangement and comprises a regulating flap valve in a single continuous duct 80, shown in the drawing by broken lines. In this particular alternative embodiment, the aforedescribed outlet duct 13 constitutes a part of the continuous duct 80 which, in the vicinity of the regulating flap 33, has a central area with a rectangular, especially square, cross-section as explained above. In this generalized case, the duct 80, including the outlet duct 13, is a component of a valve housing instead of a distributor housing 2. In the central area with the regulating flap 33, the duct 80 has a width 82 which is larger than the diameter 84 of the shaft 44. As can be seen, the regulating flap 33 has a cross-section which is similar to an ellipse; the exterior surfaces 86, 87 preferably forming portions of cylindrical surfaces. The regulating flap 33 has a major axis with a length 88 or maximum diameter which is larger than the width 82 of the duct 13 or 80. As shown, in the shown closed position, the regulating flap 33 is positioned with contact surfaces 90, 91 resting against the opposite inside walls 92, 93 of the duct 80. In order to prevent jamming, while at the same time assuring optimum sealing, the contact surfaces advantageously have a slightly crowned construction. It should be understood that the duct 80 does not need to have the rectangular, especially square, cross-section along its entire length, but instead at a certain distance from the regulating flap, separated, for example, by an approximately conical transition area 94 which can be seen in the drawing, it may have a cylindrical inner contour.

Figure 5:
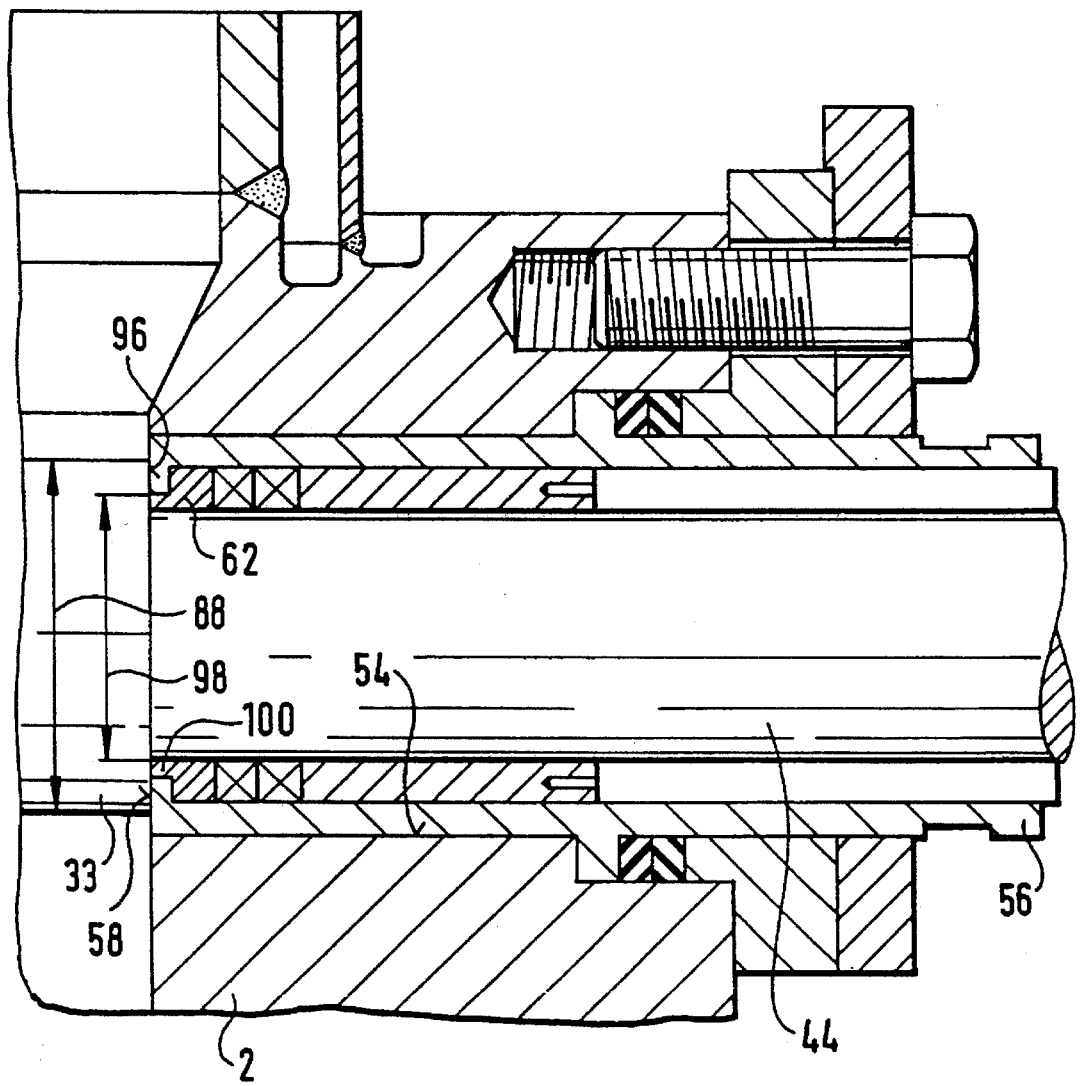
FIG. 5 is an enlarged detail view of the area enclosed by the circle V in FIG. 2.

FIG. 5 is an enlarged detail view of a circular region V shown in FIG. 2 corresponding to a sectional plane taken along section line A—A of FIG. 1. The centering bushing 56 arranged in the through bore 54 of the housing 2 rests with its inner base face 58 partially against the side surface 96 of the regulating flap 33. The base face 58 has an inside diameter 98 which is larger by a predetermined amount than the outside diameter of the shaft 44. As shown in the drawing, a part 100 of the shaft seal 62 extends through the gap between the base flange 58 and the shaft 44 and rests against the side surface 96 of the regulating flap 33. This assures a good sealing effect at side surface 96. In addition, the centering bushing 56 assures that the regulating flap 33 will have a defined axial alignment, and the contact of the base face 58 of bushing 56 with the side surface 96 of the flap 33 acts to impede undesired leakage when regulating flap 33 is in its closed position. The side contact surface 96 and the adjacent base face 58 may be manufactured with great precision so that there is virtually no annular gap between them through which leakage may occur. Furthermore, it should be emphasized that the maximum diameter of the regulating flap 33 or the length 88 of the major axis is smaller than the inside diameter of the through bore 54 of the housing 2, so that the shaft 44 with the regulating flap 33 thereon can be readily inserted through the bore into the housing 2.

The foregoing description and examples have been set forth merely to illustrate the invention and are not intended to be limiting. Since modifications of the described embodiments incorporating the spirit and substance of the invention may occur to persons skilled in the art, the invention should be construed broadly to include everything within the scope of the appended claims and equivalents thereof.

What is claimed is:

1. A valve arrangement comprising a distributor housing containing a distributor duct, an inlet duct leading into the distributor duct, and at least two outlet ducts leading out of the distributor duct, said housing further containing a valve integrated into the distributor housing and associated with each of the respective outlet ducts, each said valve variably defining a flow cross-section for a medium flowing through the inlet duct and the distributor duct and out the respective outlet duct, wherein each said outlet duct has a rectangular cross section where it leads out of the distributor duct, and each said valve comprises a regulating flap arranged proximate where the respective outlet duct leads out of the distributor duct, and each said flap has an axis of rotation arranged such that the flap is situated partially in the distributor duct and partially in the respective outlet duct.

2. A valve arrangement according to claim 1, wherein each said outlet duct has a square cross-section where it leads out of the distributor duct.

3. A valve arrangement according to claim 1, wherein adjacent each of the regulating flaps the distributor duct comprises an outer wall substantially parallel to the axis of rotation of the respective regulating flap, said outer wall having a cylindrical construction with a radius approximately equal to the distance between the axis of rotation of the respective regulating flap and the center of the distributor duct.

4. A valve arrangement according to claim 3, wherein when the regulating flaps are closed, surfaces of the flaps adjacent the distributor duct are directly contiguous to the outer wall of the distributor duct.

5. A valve arrangement according to claim 1, wherein each outlet duct has a central axis which forms an obtuse angle with a radial line extended from the center of the distributor duct through the axis of rotation of the regulating flap of the associated valve.

6. A valve arrangement according to claim 1, wherein the inlet duct is arranged substantially perpendicular to the distributor duct.

7. A valve arrangement according to claim 1, wherein the inlet duct is arranged substantially perpendicular to a plane which extends through the distributor duct and in which a central axis of at least one outlet duct is situated.

8. A valve arrangement according to claim 1, wherein the distributor housing is provided with a deflector element having a conical outer surface, said deflecting element being arranged opposite the inlet duct so that the deflector element projects at least partially into the distributor duct.

9. A valve arrangement according to claim 8, wherein the distributor housing is provided with a closure member opposite the inlet duct, and the deflector element is carried by the closure member.

10. A valve arrangement according to claim 8, wherein the conical outer surface has a rounded tip area directed toward the inlet duct.

11. A valve arrangement according to claim 1, wherein each regulating flap is mounted on a pivotable shaft positioned by means of a centering bushing in a through bore in the distributor housing.

12. A valve arrangement according to claim 11, wherein the centering bushing of each regulating flap shaft has an inner base with an end face which directly adjoins the respective outlet duct.

13. A valve arrangement according to claim 12, wherein each regulating flap shaft is surrounded by a shaft seal which rests against the inner base of the respective centering bushing.

14. A valve arrangement according to claim 12, wherein each centering bushing is positioned with its inner base adjacent a side surface of the respective regulating flap.

15. A valve arrangement according to claim 11, wherein each regulating flap has a maximum diameter which is larger than the diameter of the respective shaft on which it is mounted and smaller than the inside diameter of the through bore in which the respective shaft is positioned.

16. A valve arrangement according to claim 1, wherein each regulating flap shaft is surrounded by an inner bushing which is biased toward the respective outlet duct by at least one spring outside the distributor housing, such that the inner bushing inside the distributor housing in turn exerts a force on a shaft seal which surrounds the respective flap shaft.

17. A valve arrangement according to claim 16, wherein an axial face of each shaft seal rests against an axial face of the respective regulating flap.

18. A valve arrangement according to claim 16, wherein each shaft seal extends through an annular gap between the exterior of the respective flap mounting shaft and the inner base of the respective centering bushing.

19. A valve arrangement according to claim 1, wherein each regulating flap in closed position rests with contact surfaces against opposite interior surfaces of the respective outlet duct; the regulating flap having a maximum diameter greater than the spacing between said opposite interior surfaces of the respective outlet duct.

* * * * *